United States Patent
Omaki et al.

(10) Patent No.: US 8,787,135 B2
(45) Date of Patent: Jul. 22, 2014

(54) SIGNAL PROCESSING DEVICE, SIGNAL PROCESSING METHOD, AND OPTICAL DISC APPARATUS

(75) Inventors: Masayuki Omaki, Tokyo (JP); Kenya Nakai, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/114,059

(22) PCT Filed: Feb. 17, 2012

(86) PCT No.: PCT/JP2012/053840
§ 371 (c)(1),
(2), (4) Date: Oct. 25, 2013

(87) PCT Pub. No.: WO2012/147392
PCT Pub. Date: Nov. 1, 2012

(65) Prior Publication Data
US 2014/0043950 A1    Feb. 13, 2014

(30) Foreign Application Priority Data
Apr. 27, 2011  (JP) ................................ 2011-099502

(51) Int. Cl.
*G11B 20/10* (2006.01)
(52) U.S. Cl.
USPC .................................. 369/59.22; 369/124.01
(58) Field of Classification Search
None
See application file for complete search history.

(56) References Cited

U.S. PATENT DOCUMENTS

| | | | |
|---|---|---|---|
| 5,675,565 A | 10/1997 | Taguchi et al. | |
| 5,719,843 A | 2/1998 | Nakajima et al. | |
| 5,991,914 A | 11/1999 | Honma | |
| 6,836,511 B1 | 12/2004 | Marukawa | |

(Continued)

FOREIGN PATENT DOCUMENTS

| | | |
|---|---|---|
| JP | 9-7313 A | 1/1997 |
| JP | 9-17130 A | 1/1997 |

(Continued)

OTHER PUBLICATIONS

Fuji et al., "Observation of Eye Pattern on Super-Resolution Near-Field Structure Disk with Write-Strategy Technique," Japanese Journal of Applied Physics, vol. 43, No. 7A, 2004, pp. 4212-4215.

(Continued)

*Primary Examiner* — Thang Tran
(74) *Attorney, Agent, or Firm* — Birch, Stewart, Kolasch & Birch, LLP

(57) ABSTRACT

Provided is a signal processing device including: an adaptive filter; a PRML circuit for sequentially generating binarized data from a filtered reproduced waveform by sampling at sampling points in a period based on a clock signal and sequentially generating a partial response waveform which is to be the target waveform from the binarized data; a calculating unit for sequentially calculating first phase errors from a difference between the target waveform and the filtered reproduced waveform; a limiting unit for outputting second phase errors by excluding a specific phase error from the first phase errors; and a clock generating unit for generating the clock signal of a frequency corresponding to the second phase errors; wherein the specific phase error includes a phase error at a time when the partial response waveform reaches a specific level which excludes at least a level not less than a predetermined amplitude level.

10 Claims, 12 Drawing Sheets

(56) References Cited

U.S. PATENT DOCUMENTS

| | | |
|---|---|---|
| 2006/0087947 A1 | 4/2006 | Minemura et al. |
| 2006/0203949 A1* | 9/2006 | Minemura et al. ............ 375/376 |
| 2006/0280240 A1* | 12/2006 | Kikugawa et al. ............ 375/341 |
| 2008/0151987 A1* | 6/2008 | Maruyama et al. ............ 375/232 |
| 2009/0180368 A1* | 7/2009 | Miyashita et al. ......... 369/53.35 |
| 2010/0061490 A1* | 3/2010 | Noeldner ....................... 375/341 |
| 2010/0061492 A1* | 3/2010 | Noeldner ....................... 375/343 |

FOREIGN PATENT DOCUMENTS

| | | |
|---|---|---|
| JP | 9-219068 A | 8/1997 |
| JP | 2000-123487 A | 4/2000 |
| JP | 2001-176208 A | 6/2001 |
| JP | 2006-120233 A | 5/2006 |
| JP | 2006-127559 A | 5/2006 |
| JP | 2008-146696 A | 6/2008 |
| JP | 2009-176405 A | 8/2009 |

OTHER PUBLICATIONS

Kikukawa et al., "Low Frequency Noise Reduction of Super-Resolution Near-Field Structure Disc with Platinum-Oxide Layer," ODS Technical Digest, ThC3, 2005.

* cited by examiner

FIG. 8

| STATISTICAL RESULT OF ERRORS TO DATA LENGTHS OF REPRODUCED WAVEFORM | | | | |
|---|---|---|---|---|
| DATA LENGTH | NUMBER OF SAMPLE | NUMBER OF ERROR | ERROR RATE | OCCUPANCY RATIO |
| 2T | 8324 | 88 | 2.20E-03 | 40.20% |
| 3T | 8123 | 102 | 2.60E-03 | 46.60% |
| 4T | 7176 | 12 | 3.00E-04 | 5.50% |
| 5T | 5380 | 8 | 2.00E-04 | 3.70% |
| 6T | 3978 | 4 | 1.00E-04 | 1.80% |
| 7T | 2002 | 4 | 1.00E-04 | 1.80% |
| 8T | 1304 | 1 | 2.50E-05 | 0.50% |
| 9T | 342 | 0 | 0.00E+00 | 0.00% |
| DATA LENGTH RANGE | | | | |
| 2T-3T | 16447 | 190 | 5.19E-03 | 44.90% |
| 2T-4T | 23623 | 202 | 5.51E-03 | 64.49% |
| 2T-5T | 29003 | 210 | 5.73E-03 | 79.18% |
| 2T-6T | 32981 | 214 | 5.84E-03 | 90.04% |
| 2T-7T | 34983 | 218 | 5.95E-03 | 95.51% |
| 2T-8T | 36287 | 219 | 5.98E-03 | 99.07% |
| 2T-9T | 36629 (TOTAL NUMBER OF SAMPLE) | 219 (TOTAL NUMBER OF ERROR) | 5.50E-03 | 100% |

FIG. 9

| STATISTICAL RESULT OF SAMPLE POINTS TO AMPLITUDE LEVELS ||||| 
|---|---|---|---|---|
| AMPLITUDE LEVEL | RATIO | AVERAGE VALUE | DIVERGENCE | DIVERGENCE RATIO |
| −4 | 5.5% | −4.00 | 1.57E−01 | 7% |
| −3 | 10.9% | −2.81 | 2.03E−01 | 10% |
| −2 | 3.7% | −1.35 | 5.63E−01 | 27% |
| −1 | 18.4% | −0.95 | 2.00E−01 | 9% |
| 0 | 23.0% | −0.23 | 2.22E−01 | 10% |
| +1 | 18.3% | 1.06 | 2.28E−01 | 11% |
| +2 | 3.8% | 1.66 | 2.79E−01 | 13% |
| +3 | 10.8% | 3.04 | 1.64E−01 | 8% |
| +4 | 5.6% | 3.99 | 9.90E−02 | 5% |

FIG. 10

| STATISTICAL RESULT OF PROBABILITIES THAT CAN BE TAKEN BY RESPECTIVE DATA LENGTHS AT AMPLITUDE LEVELS +4 TO -4 | | | | | | | | | |
|---|---|---|---|---|---|---|---|---|---|
| AMPLITUDE LEVEL / DATA LENGTH | +4 | +3 | +2 | +1 | 0 | -1 | -2 | -3 | -4 | PROBABILITY TOTAL |
| 2T | 0% | 9% | 7% | 16% | 37% | 16% | 7% | 9% | 0% | 100% |
| 3T | 0% | 6% | 4% | 26% | 26% | 26% | 4% | 6% | 0% | 96% |
| 4T | 0% | 15% | 3% | 17% | 17% | 17% | 3% | 14% | 0% | 86% |
| 5T | 6% | 8% | 1% | 10% | 11% | 10% | 1% | 8% | 6% | 63% |
| 6T | 8% | 5% | 1% | 6% | 6% | 6% | 1% | 5% | 8% | 47% |
| 7T | 5% | 2% | 0% | 3% | 3% | 3% | 0% | 2% | 5% | 24% |
| 8T | 4% | 1% | 0% | 2% | 1% | 2% | 0% | 1% | 4% | 15% |
| 9T | 1% | 0% | 0% | 0% | 0% | 0% | 0% | 0% | 1% | 4% |
| DATA LENGTH RANGE | | | | | | | | | | |
| 2T-9T | 24% | 47% | 16% | 80% | 100% | 80% | 16% | 47% | 24% | 434% |
| 2T-3T | 0% | 15% | 11% | 42% | 63% | 41% | 11% | 14% | 0% | 196% |
| 2T-4T | 0% | 29% | 13% | 59% | 80% | 59% | 14% | 29% | 0% | 282% |
| 5T-9T | 24% | 18% | 3% | 21% | 21% | 21% | 3% | 18% | 24% | 152% |

SIGNAL PROCESSING DEVICE, SIGNAL PROCESSING METHOD, AND OPTICAL DISC APPARATUS

TECHNICAL FIELD

The present invention relates to a signal processing device and a signal processing method for generating binarized data by performing processing using a PRML (partial response maximum likelihood) scheme on a reproduced signal from a recording medium in which binary data is recorded, and an optical disc apparatus including the signal processing device.

BACKGROUND ART

Increase in capacity of various optical discs has been achieved by reducing size of record marks (including pits) which are binary data formed on tracks of the optical discs, and by reducing focus spot size on focal planes using an objective lens which makes a laser beam used for recording and reproduction have a shorter wavelength and has a large numerical aperture.

For example, in CDs (compact discs), a disc substrate functioning as a light transmission layer has a thickness of approximately 1.2 (mm), a laser-beam wavelength of approximately 780 (nm) is employed, a numerical aperture of an objective lens is 0.45, and a recording capacity is 650 (MB). A resolution of pits for recording signals is restricted by a diffraction limit. The diffraction limit DL is given as $DL=\lambda/(4\times NA)$, in which a laser-beam wavelength $\lambda$ and a numerical aperture NA are used. The diffraction limit in CDs is calculated from this equation, which yields a value of approximately 430 (nm). In CDs, since a shortest data length (shortest pit length) is approximately 830 (nm), a size of the shortest data length is approximately 1.93 times of a focus spot size determined by the diffraction limit.

Moreover, in DVDs (digital versatile discs), a light transmission layer has a thickness of approximately 0.6 (mm), a laser-beam wavelength of approximately 650 (nm) is employed, an NA is 0.6, and a recording capacity is 4.7 (GB). The diffraction limit in DVDs can be calculated from the same equation as that in the case of CDs, which yields a value of approximately 270 (nm). In DVDs, a shortest data length (shortest pit length) is approximately 400 (nm) and a size of the shortest data length is approximately 1.48 times of a focus spot size.

Furthermore, in BDs (Blu-ray discs), a light transmission layer has a thickness of 0.1 (mm), a laser-beam wavelength of approximately 405 (nm) is employed, an NA is 0.85, and a recording capacity is 25 (GB) per one recording layer. The diffraction limit in BDs can be calculated from the same equation as that in the case of CDs, which yields a value of approximately 120 (nm). In BDs, a shortest data length (shortest pit length) is approximately 150 (nm) and a size of the shortest data length is approximately 1.25 times of a focus spot size.

As described above, the increase in capacity of optical discs is achieved not only by reducing a focus spot in size but also by reducing a ratio of a size of the shortest data length (the shortest pit length) to a focus spot size (approximately 1.93 times in CDs and approximately 1.25 times in BDs). In order to reduce the ratio, it is necessary to reduce an SNR (Signal to Noise Ratio) required in reproduced signals which are read out. As a signal processing technique for this, a PRML scheme, in which a condition that reproduced waveforms from optical discs have known partial-response characteristics is combined with a maximum likelihood estimation method according to Viterbi decoding scheme, has been developed. This technique has contributed to improvement in error rates.

For example, for BDs, a PRML scheme where (1, 2, 2, 1) is used as a partial response class is commonly used. The class (1, 2, 2, 1) is an expression of optical responses to recorded binary data (intersymbol interference) in seven gradation levels (amplitude levels), and it allows an expression approximately expressing actual reproduced waveforms. In the PRML scheme, ideal optical responses which approximately expresses reproduced waveforms are derived using the maximum likelihood estimation method (Viterbi decoding scheme), thereby estimating binary data recorded on BDs.

Moreover, in HD DVDs (High-Definition Digital Versatile Disc), a shortest data length (shortest pit length) is approximately 200 (nm) and is less than a diffraction limit of approximately 270 (nm). For this reason, in a case of HD DVDs, the shortest data (shortest pit) can be read by using (1, 2, 2, 2, 1) as a partial response class and expressing an optical response (intersymbol interference) to recorded binary data in nine gradation levels (amplitude levels).

As described above, since it is difficult to physically improve a resolution which is restricted by the diffraction limit, signal processing plays a more major role in achieving the increase in capacity of optical discs. In particular, it is not expected that a laser-beam wavelength shorter than a wavelength of 405 (nm) for BDs is put to practical use, from viewpoints of inviting deteriorations in optical elements and expecting harmful effects on the human body. For this reason, it is intended to realize the increase in capacity by a method that uses nearfield light, multilayering of recording layers, use of holography or other methods. If asymmetry of a reproduced waveform is deteriorated or signal intensity near the shortest data length decreases, quality of a reproduced signal is further deteriorated and therefore a further improvement in signal processing techniques is required. Moreover, deterioration of a reproduced signal in quality harmfully influences extraction of a clock signal.

For example, Non-Patent Documents 1 and 2 disclose optical super resolution techniques called Super-RENS (Super REsolution Nearfield Structure). According to the techniques, by causing a refractive-index change at a local part where light intensity is large or a temperature is high in a focus spot on an optical disc, it is possible to reproduce record marks that are smaller than the diffraction limit $\lambda/(4\times NA)$ determined by a numerical aperture NA of a condenser lens which is an optical element of an optical disc apparatus and a wavelength $\lambda$ of light. The local part where the refractive-index change is caused is now simply referred to as an aperture. Since this aperture is excited by energy and is derived by the refractive-index change accompanied by a crystal-structure change, there is a temporal delay in response to light. If this delay is not negligible to a rotation speed of the optical disc, a signal read out by near-field light is undesirably partially delayed, thereby producing harmful influence on decoding of a signal and extraction of a clock signal.

In optical disc apparatuses, data recorded in an optical disc itself is recorded with a stable clock signal. However, at a time of reproducing from the optical disc, it is impossible to regenerate a spindle rotation which is completely the same as that at a time of recording, and therefore it is necessary to reproduce the clock signal each time. In optical disc apparatuses, it is common to adopt a method of extracting a clock signal from a reproduced signal itself using a PLL (Phase-Locked Loop) circuit. In general, a PLL circuit is formed by a phase comparator, a loop filter and a voltage-controlled oscillator. The phase comparator compares a phase which is calculated from a reproduced signal sampled by a clock signal and a phase of the clock signal itself, thereby outputting a phase error signal corresponding to a phase difference between them. The loop filter supplies a control voltage which is obtained by filtering the phase error signal from the phase comparator, to the voltage-controlled oscillator. The voltage-controlled oscillator outputs a clock signal of a frequency proportional to the control voltage. A reproduced signal is sequentially sampled by the output clock signal from the voltage-controlled oscillator, the output clock signal from the voltage-controlled oscillator influences a calculation of a phase of a reproduced signal, and thus the PLL circuit forms a loop feedback circuit. By the loop feedback circuit, a frequency and a phase difference of the output clock signal vary in accordance with a frequency of an input signal. When a phase error between a sampling point of the reproduced signal and the clock signal is calculated, a point (a crossing point) where the reproduced signal intersects a certain slice level is defined as a clock point. In other words, a difference between the crossing point and the sampling point is a phase error between the reproduced signal (reproduced waveform) and the clock signal, and the loop feedback circuit works so as to make them equal. As a slice level, a center level (average level) of a reproduced waveform is usually used and it is a level where there are largest number of the crossing points in a reproduced waveform of an optical disc.

Moreover, there is a method of calculating a phase error between a reproduced waveform and a clock signal, in combination with a PRML scheme (see Patent Document 1, for example). This is a method of calculating a phase error at each sampling point, without setting a slice level. In this method, an ideal waveform is predicted according to the PRML scheme and a difference between the ideal waveform and the reproduced waveform is calculated as a phase error.

PRIOR ART REFERENCE

Non-Patent Documents

Non-Patent Document 1: Hiroshi FUJI et al., "Observation of Eye Pattern on Super-Resolution Near-Field Structure Disk with Write-Strategy Technique", Japanese Journal of Applied Physics, Vol. 43, No. 7A, pp. 4212-4215 (2004).

Non-Patent Document 2: KIKUKAWA Takashi et al., "Low Frequency Noise Reduction of Super-Resolution Near-Field Structure Disc with Platinum-Oxide Layer", ODS Technical Digest, ThC3 (2005).

Patent Document

Patent Document 1: Japanese Patent Application Publication No. 9-219068

SUMMARY OF THE INVENTION

Problem to be Solved by the Invention

However, methods described in the Non-Patent Documents 1 and 2 are not effective for a reproduced signal (reproduced waveform) having a greatly deteriorated waveform. For example, in optical discs, as a data length (record mark length) of recorded binary data (record marks) is shorter, an SNR tends to decrease and an amplitude level of a reproduced waveform of binary data having a short data length tends to concentrate at a center level. For this reason, in a case of the method in which a phase error between a crossing point (clock point) where a reproduced signal intersects a slice level and a sampling point is calculated, there is a problem that a variation in a phase error increases and a clock signal is unstabilized and quality of binarized data as a reproduced signal is deteriorated.

Moreover, as shown in Patent Document 1, in a case where a predicted waveform (ideal waveform) which is predicted according to the PRML scheme is used as a target waveform, the target waveform itself includes an error and a phase error is undesirably calculated using the target waveform including the error as a reference. For this reason, the art shown in Patent Document 1 has a problem that a variation in a phase error increases and a clock signal is unstabilized and quality of binarized data as a reproduced signal is deteriorated.

Therefore, the present invention is made to solve the above-described problems in the conventional arts and an object of the present invention is to provide a signal processing device, a signal processing method and an optical disc apparatus that can improve quality of binarized data as a reproduced signal by generating a stable clock signal.

Means for Solving the Problem

A signal processing device according to an aspect of the present invention includes: an adaptive filter for filtering adaptively a reproduced waveform of a reproduced signal from a recording medium so as to make the reproduced waveform be closer to a target waveform; a PRML circuit for sequentially generating binarized data from the filtered reproduced waveform using a PRML scheme by sampling at sampling points in a period based on a clock signal and sequentially generating a partial response waveform which is to be the target waveform from the binarized data; a calculating unit for sequentially calculating first phase errors with regard to the sampling points from a difference between the target waveform and the filtered reproduced waveform; a limiting unit for outputting second phase errors by excluding a specific phase error from the first phase errors; and a clock generating unit for generating the clock signal of a frequency corresponding to the second phase errors; wherein the specific phase error includes a phase error at a time when the partial response waveform reaches a specific level which excludes at least a level not less than a predetermined amplitude level.

A signal processing method according to an aspect of the present invention includes the steps of: filtering adaptively a reproduced waveform of a reproduced signal from a recording medium so as to make the reproduced waveform be closer to a target waveform; sequentially generating binarized data from the filtered reproduced waveform using a PRML scheme by sampling at sampling points in a period based on a clock signal and sequentially generating a partial response waveform which is to be the target waveform from the binarized data; sequentially calculating first phase errors with regard to the sampling points from a difference between the target waveform and the filtered reproduced waveform; outputting second phase errors by excluding a specific phase error from the first phase errors; and generating the clock signal of a frequency corresponding to the second phase errors; wherein the specific phase error includes a phase error at a time when the partial response waveform reaches a specific level which excludes at least a level not less than a predetermined amplitude level.

A signal processing method according to another aspect of the present invention includes: a step of filtering adaptively a reproduced waveform of a reproduced signal from a recording medium so as to make the reproduced waveform be closer to a target waveform; a step of sequentially generating binarized data from the filtered reproduced waveform using a PRML scheme by sampling at sampling points in a period based on a clock signal, while sequentially generating a partial response waveform from the binarized data; a step of generating the target waveform by equalizing the partial response waveform; a step of sequentially calculating a phase error with regard to the sampling point from a difference between the partial response waveform and the filtered reproduced waveform; and a step of generating the clock signal of a frequency corresponding to the phase error.

A disc apparatus according to an aspect of the present invention includes: an optical head device for optically reading binary data recorded in a recording medium; a reproduced signal processing unit for generating a reproduced signal from a signal output from the optical head device; and the signal processing device for generating the binarized data from the reproduced signal.

Effect of the Invention

The signal processing device, the signal processing method and the optical disc apparatus according to the present invention have an effect that a stable clock signal can be generated and therefore quality of the binarized data as the reproduced signal can be improved.

BRIEF DESCRIPTION OF THE DRAWINGS

FIG. 8 is a diagram illustrating an error distribution for each data length of a reproduced waveform as a table, in a case where (1, 2, 2, 2, 1) is used as a partial response class;

FIG. 9 is a diagram illustrating a distribution for each level of a reproduced waveform as a table, in a case where (1, 2, 2, 2, 1) is used as a partial response class;

FIG. 10 is a diagram illustrating a distribution of data lengths at respective levels as a table, in a case where (1, 2, 2, 2, 1) is used as a partial response class;

MODE FOR CARRYING OUT THE INVENTION (1) First Embodiment (1-1) Explanation of Optical Disc Apparatus 60

Figure 1:
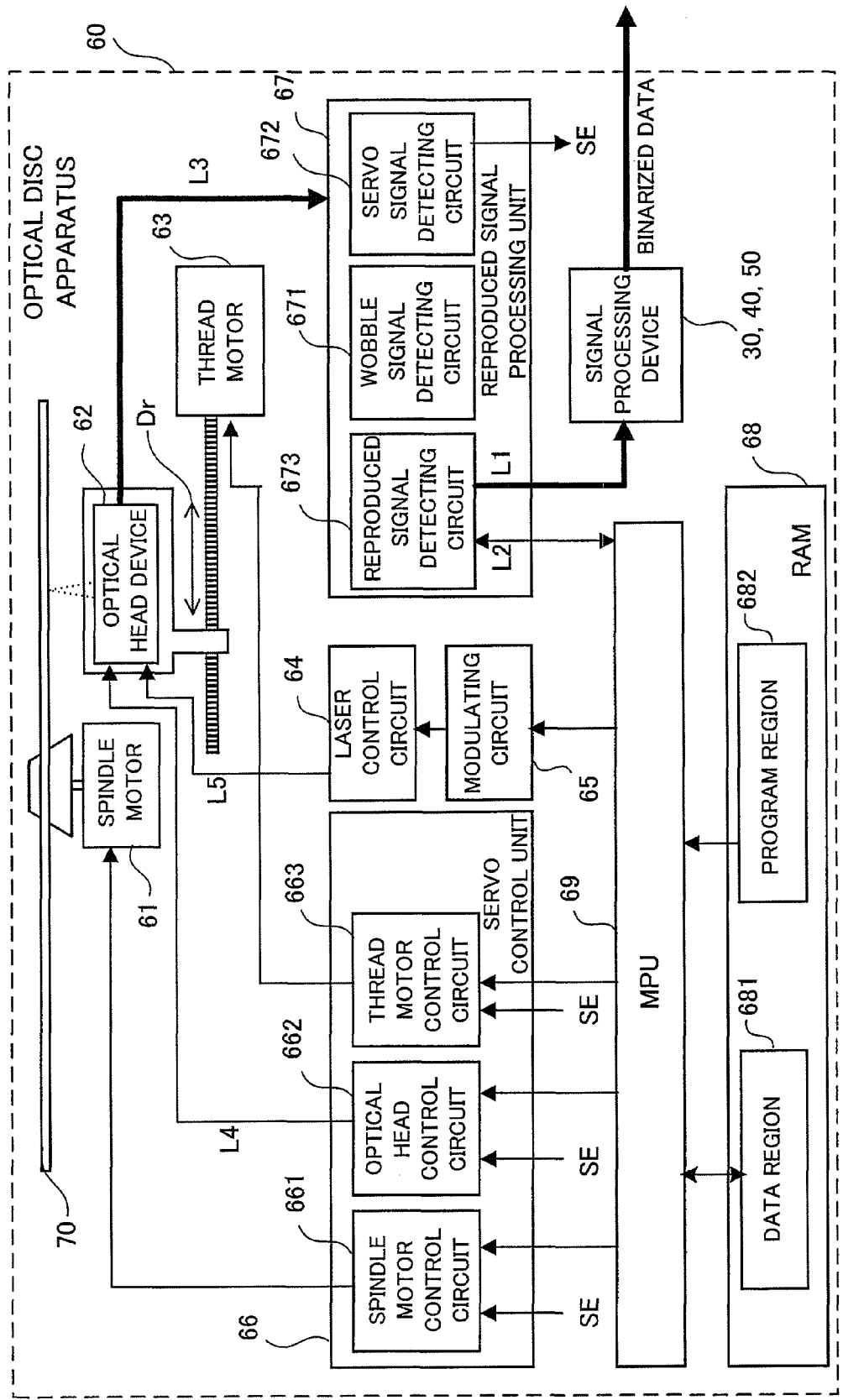
FIG. 1 is a diagram schematically illustrating a configuration of an optical disc apparatus capable of incorporating a signal processing device according to first to third embodiments of the present invention.

FIG. 1 is a diagram schematically illustrating a configuration of an optical disc apparatus 60 which is a reproducing apparatus capable of incorporating a signal processing device 30 according to a first embodiment (or a signal processing device 40 according to a second embodiment or a signal processing device 50 according to a third embodiment). The optical disc apparatus 60 is an apparatus that has a function to optically read binary data (record marks) recorded in an information recording layer of an optical disc 70 which is a recording medium such as a CD, a DVD and a BD and to output binarized data as a reproduced signal of the recorded binary data. The optical disc apparatus 60 includes the signal processing device 30 according to the first embodiment, thereby preventing the binarized data which is output as the reproduced signal from differing from the binary data which is actually recorded in the optical disc 70 (making them be closer to each other).

As illustrated in FIG. 1, the optical disc apparatus 60 includes a spindle motor 61 for rotationally driving the optical disc 70 which is loaded onto a turntable, and an optical head device 62 for illuminating the information recording layer of the optical disc 70 with a laser beam and receiving a returning light beam which was reflected at the information recording layer to output a signal. The optical disc apparatus 60 further includes a thread motor 63 which is a driving means for moving the optical head device 62 in a radial direction Dr of the optical disc 70, a laser control circuit 64, a modulating circuit 65, a servo control circuit 66, a reproduced signal processing unit 67, a RAM (Random Access Memory) 68, and an MPU (Micro Processing Unit) 69. In addition, in FIG. 1, unidirectional or bidirectional arrows that connect constitutional elements (blocks) indicate paths and directions of representative flows of signals or information between the constitutional elements in the optical disc apparatus 60, but the arrows indicate neither all connection relationships between the constitutional elements nor all directions of information flows.

The servo control unit 66 includes a spindle motor control circuit 661 for controlling operations of the spindle motor 61, an optical head control unit 662 for controlling operations of the optical head device 62, and a thread motor control circuit 663 for controlling operations of the thread motor 63. These control circuits 661, 662 and 663 operate on the basis of a command signal output from the MPU 69.

The reproduced signal processing unit 67 includes a servo signal detecting circuit 672 for generating a servo signal on the basis of a signal detected by the optical head device 62 and transmitted through a transmission path L3, a reproduced signal detecting circuit 673 for detecting a reproduced signal to output it as an output signal to a transmission path L1, and a wobble signal detecting circuit 671 for detecting a wobble signal obtained from reflection light from a meandering guide-track groove on the optical disc 70.

The RAM 68 has a program region 681 and a data region 682. The MPU 69 controls operations of each component according to a program recorded in the RAM 68 and determines a control content on the basis of signals transmitted from each component.

The MPU 69 determines operations of the whole of the optical disc apparatus 60 on the basis of an output signal transmitted through a transmission path L2, such as signal amplitude value data detected at the reproduced signal detecting circuit 673 and a state signal, or another output signal transmitted from each component. The MPU 69 transmits control data (e.g., a signal of the transmission path L2 from the MPU 69 to the reproduced signal detecting circuit 673) to each component to control each component. In addition, it may be configured that part of processing performed by the constitutional elements 671, 672 and 673 of the reproduced signal processing unit 67 is carried out inside the MPU 69.

The optical head control unit 662 outputs a control signal that is based on a servo error signal SE transmitted from the servo signal detecting circuit 672 and an operation command (command signal) from the MPU 69, to the optical head device 62 through a transmission path L4, thereby controlling illumination light supplied from the optical head device 62 onto the optical disc 70. The thread motor control circuit 663 controls operations of the thread motor 63, on the basis of the servo error signal SE transmitted from the servo signal detecting circuit 672 and an operation command from the MPU 69. The spindle motor control circuit 661 controls operations of the spindle motor 61, on the basis of the servo error signal SE transmitted from the servo signal detecting circuit 672 and an operation command from the MPU 69.

The signal processing device 30 receives a reproduced signal (first reproduced signal) from the reproduced signal detecting circuit 673 through the transmission path L1, and performs demodulation on the reproduced signal to generate binarized data (second reproduced signal).

Part of data output from the MPU 69 is converted by the modulating circuit 65 into a recording signal which is suitable for being recorded on the optical disc 70, and is then transmitted to the laser control circuit 64. The laser control circuit 64 transmits a control signal based on the recording signal from the modulating circuit 65 to the optical head device 62 through a transmission path L5, thereby controlling light-emission power of a semiconductor laser which is mounted in the optical head device 62.

The optical head device 62 operates on the basis of the control signal from the laser control circuit 64, and condenses a light beam emitted by the semiconductor laser onto the optical disc 70. Moreover, the optical head device 62 receives a returning light beam reflected at the information recording layer of the optical disc 70, and performs detection for generating a reproduced signal and a servo signal.

(1-2) Explanation of Signal Processing Device 10 in First Reference Example

Figure 2:
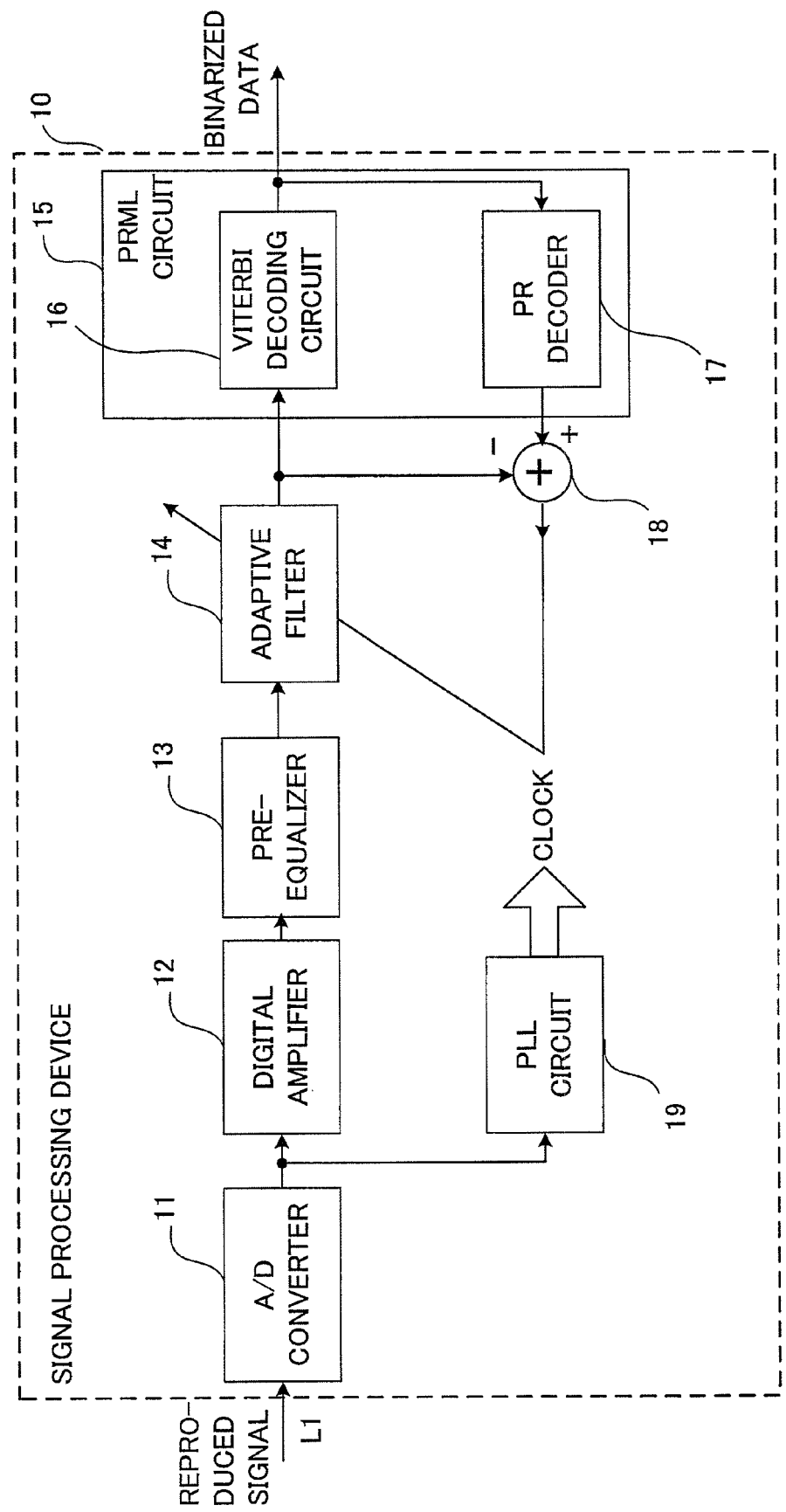
FIG. 2 is a block diagram schematically illustrating a configuration of a signal processing device in a first reference example.

Next, by referring to FIGS. 2, 3 and 4, a signal processing device 10 in a first reference example will be explained. FIG. 2 is a block diagram schematically illustrating a configuration of the signal processing device 10 in the first reference example. The signal processing device 10 in the first reference example is an example of a device that can be used in the optical disc apparatus 60 illustrated in FIG. 1, as a substitute for the signal processing device 30. The signal processing device 10 in the first reference example generates, from a reproduced signal which is input from the reproduced signal detecting circuit 673 through the transmission path L1, binarized data which is the reproduced signal after signal processing. As illustrated in FIG. 2, the signal processing device 10 in the first reference example includes an A/D (analog-to-digital) converter circuit 11, a digital amplifier 12, a preequalizer 13, an adaptive filter 14, a PRML circuit 15, an adder (subtractor) 18 as a unit for calculating a phase error, and a PLL circuit 19. The PRML circuit 15 includes a Viterbi decoding circuit 16 for performing processing according to a maximum likelihood estimation method on an output signal from the adaptive filter 14, and a PR (Partial Response) decoder 17 for generating a partial response waveform from binarized data output from the Viterbi decoding circuit 16.

The A/D converter circuit 11 converts an input reproduced signal into a digital value. The PLL circuit 19 generates a clock signal which is synchronized with the digitized reproduced signal from the A/D converter circuit 11, and supplies it to each constituent element of the signal processing device 10 including the A/D converter circuit 11.

The digital amplifier 12 adjusts the digitized reproduced signal from the A/D converter circuit 11 so that it reaches a desired amplitude level. By configuring the digital amplifier 12 as an AGC (Auto Gain Control) circuit which automatically adjusts the amplitude level so as to keep it at a constant level, a variation in the amplitude level of the reproduced signal that arises from a variation in reflection light from the optical disc 70 or the like can be disregarded in subsequent circuits.

The preequalizer 13 mainly amplifies a high-frequency component near a shortest data length in a waveform of the reproduced signal, an amplitude level of which is adjusted to a desired amplitude level. Since a high-frequency component near the shortest data length tends to be excessively small due to MTF (Modulation Transfer Function) characteristic of light, amplifying the high-frequency component near the shortest data length to some degree makes it easy to perform processing at a filter as a subsequent stage.

The adaptive filter 14 is used in combination with the PRML circuit 15 as a subsequent stage, and performs filtering processing by using an ideal reproduced waveform estimated by the PRML circuit 15 as a target waveform. The ideal reproduced waveform is output from the PR decoder 17 as a predicted waveform.

A representative adaptive algorithm used in the adaptive filter 14 is an LMS (Least Mean Square) algorithm, for example. According to the LMS algorithm, an updated coefficient $w_k(n+1)$ will be given by the following equation (1), where data of an input signal at a time n is denoted by $x(n)$, a coefficient at a filter tap k (k-th tap) is denoted by $w_k(n)$, an updating step for a filter coefficient is denoted by p, and an error signal is denoted by $e(n)$. In addition, k and n are positive integers.

$$w_k(n+1) = w_k(n) + 2 \cdot \mu \cdot e(n) \cdot x(n) \qquad (1)$$

In this regard, the error signal $e(n)$ will be given by the following equation (2), where a data string of a filtered reproduced waveform is denoted by $y(n)$ and a data string of a target waveform is denoted by $d(n)$.

$$e(n) = d(n) - y(n) \qquad (2)$$

These equations are derived from an algorithm where an instantaneous square error $e^2(n)$ at a time n is smallest, and the instantaneous square error is temporally averaged according to the algorithm.

As the adaptive algorithm used in the adaptive filter 14, other algorithms such as a normalized LMS algorithm, a RMS (Recursive Least Square) algorithm and a projection algorithm may be also used.

Figure 3:
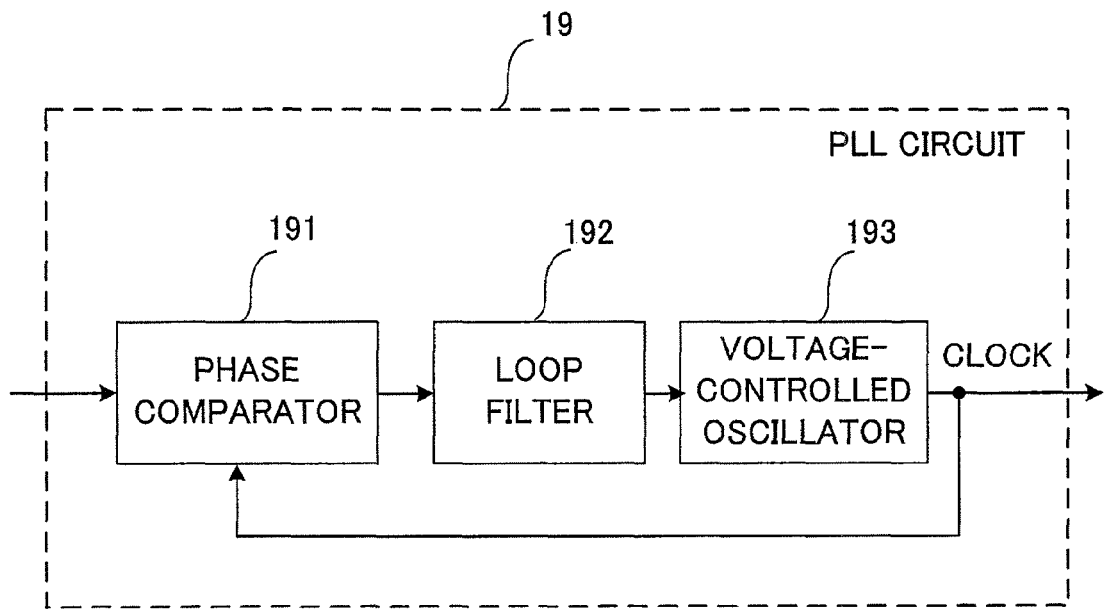
FIG. 3 is a block diagram schematically illustrating an example of a configuration of a PLL circuit illustrated in FIG. 2.

FIG. 3 is a block diagram illustrating a typical configuration of the PLL circuit 19 illustrated in FIG. 2. As illustrated in FIG. 3, the PLL circuit 19 includes a phase comparator 191, a loop filter 192 and a voltage-controlled oscillator 193. The phase comparator 191 compares a phase calculated from a reproduced signal sampled by a clock signal and a phase of the clock signal itself to output a phase error signal corresponding to a phase difference between them. The loop filter 192 performs filtering on the phase error signal from the phase comparator 191 to supply it as a control voltage to the voltage-controlled oscillator 193. The voltage-controlled oscillator 193 outputs a clock signal of a frequency proportional to the received control voltage as an output clock signal, to each constituent element. The PLL circuit 19 forms a loop feedback circuit that sequentially samples the reproduced signal by the output clock signal. Because of this, a frequency and a phase difference of the output clock signal vary in accordance with a frequency of an input signal.

For example, in a case where a signal modulation scheme is 1-7 RLL (Run Length Limit) modulation, provided that a length of a period (one clock period) of a clock signal output from the PLL circuit 19 is T, a reproduced signal has a length within a range from 2T (shortest data length) to 8T. A case where the 1-7 RLL modulation is used will be described below.

Figure 4:
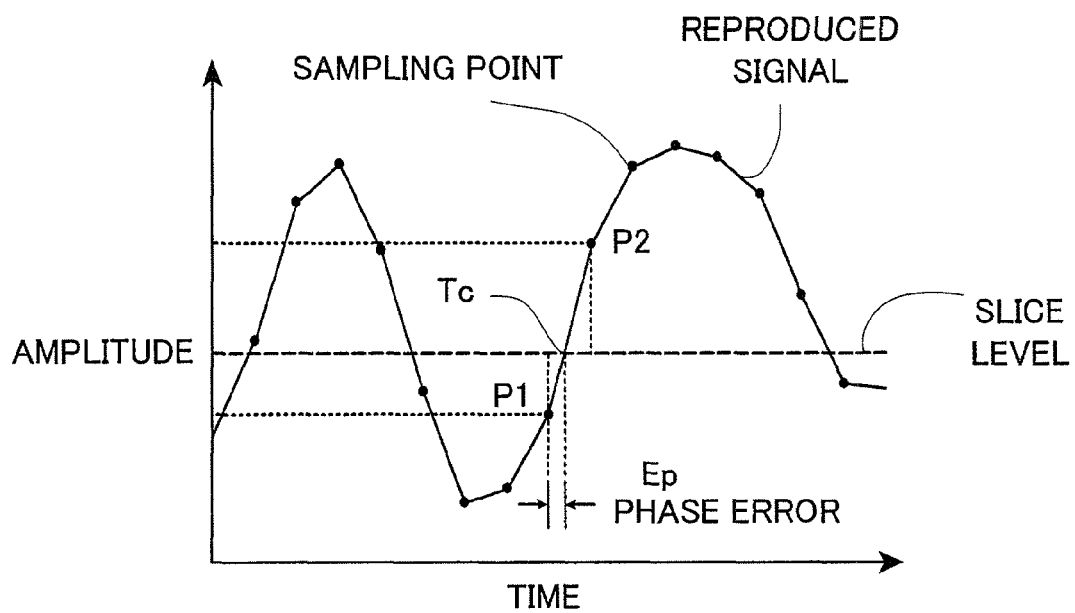
FIG. 4 is a diagram illustrating a method of calculating a phase error using a slice level in the PLL circuit.

FIG. 4 is a diagram illustrating a method of calculating a phase error in the PLL circuit 19 using a slice level. In FIG. 4, as a typical phase comparison method, a crossing point where a reproduced signal (reproduced waveform) and a certain slice level intersect and a rising or falling point of a clock signal are compared. More specifically, the phase comparator 191 detects sampling points P1 and P2 (points illustrated as black dots P1 and P2 in FIG. 4) before and after a point where the slice level and the reproduced waveform intersect, calculates a crossing point Tc by using a ratio between electrical potentials at the two points according to an interpolation method which uses linear approximation, and calculates a time interval between the crossing point Tc and the sampling point P1 as a phase error Ep. As the slice level, a zero level (0 level) which is a center level (average level) of a reproduced waveform is typically used. However, in a case where a low-frequency offset dependent on a rotational period is superimposed on a reproduced waveform or in like cases, for example, a technique where a slice level is variable may be used so as to cancel an offset amount.

In a case where a reproduced waveform with remarkable signal deterioration and with a large jitter noise is input as a reproduced signal to the signal processing device 10 in the first reference example, the phase error Ep obtained from the slice level and the sampling points P1 and P2 is also influenced by the jitter noise. Typically, as a data length (record mark length) of binary data (record marks) recorded in a recording medium is shorter, an influence of a jitter noise tends to be greater. Typically, since an amplitude level of a reproduced waveform generated by reproduction of binary data having a short data length concentrates in the vicinity of a slice level, the reproduced signal of the binary data having the short data length is especially greatly influenced by a jitter noise.

(1-3) Explanation of Signal Processing Device 20 in Second Reference Example

Figure 5:
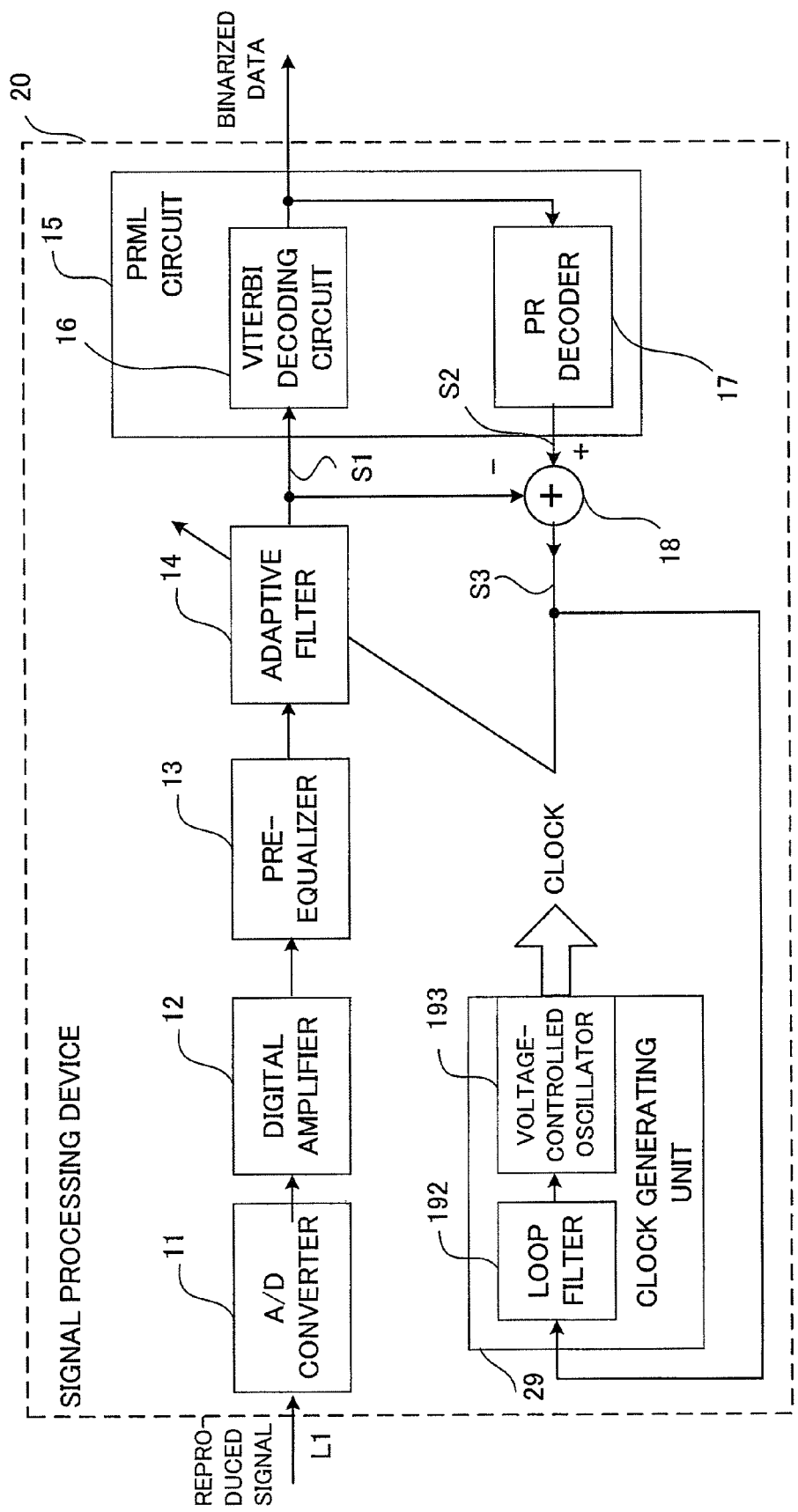
FIG. 5 is a block diagram schematically illustrating a configuration of a signal processing device in a second reference example.

FIG. 5 is a block diagram schematically illustrating a configuration of a signal processing device 20 in a second reference example. The signal processing device 20 in the second reference example is a device that is hardly subject to an influence of a jitter noise which causes the problem in the signal processing device 10 in the first reference example. The signal processing device 20 in the second reference example is a device that can be used in the optical disc apparatus 60 illustrated in FIG. 1, as a substitute for the signal processing device 30. In FIG. 5, constituent elements that are the same as or correspond to those shown in FIG. 2 (the signal processing device 10 in the first reference example) are assigned the same reference characters.

The signal processing device 10 in the first reference example illustrated in FIG. 2 generates a phase error signal (phase error) from a reproduced signal which is sequentially sampled at the A/D converter circuit 11, generates a control voltage based on the phase error, and causes a PLL circuit 19 for outputting a clock signal of a frequency proportional to the control voltage to vary a frequency and a phase difference of the clock signal in accordance with a frequency of the input reproduced signal. So, if a reproduced signal with a large jitter noise is input to the signal processing device 10 in the first reference example, a phase error obtained from the slice level and the sampling points P1 and P2 is influenced by the jitter noise, and as a result a clock signal generated at the PLL circuit 19 becomes unstable.

By contrast, the signal processing device 20 in the second reference example illustrated in FIG. 5 generates a clock signal by using a phase error S3 between a partial response waveform S2 which is a predicted signal (predicted waveform) estimated according to the PRML scheme and a reproduced signal (reproduced waveform) S1, without using a slice level which is used in the signal processing device 10 in the first reference example (FIG. 2). For this reason, the signal processing device 20 in the second reference example illustrated in FIG. 5 includes the clock signal generating unit 29 that is formed by part of the constituent elements forming the PLL circuit 19 in the signal processing device 10 (FIG. 2) in the first reference example, i.e., the loop filter 192 and the voltage-controlled oscillator 193. In addition, the signal processing device 20 in the second reference example may include the PLL circuit 19. In this case, it is required to provide a constituent element (e.g., a switch circuit or the like) that makes it possible to use the loop filter 192 and the voltage-controlled oscillator 193 separately from the phase comparator 191 in the PLL circuit 19.

In the signal processing device 20 in the second reference example, the phase error S3 is input to the clock signal generating unit 29, the loop filter 192 generates a control voltage based on the phase error signal, and the voltage-controlled oscillator 193 outputs a clock signal of a frequency proportional to the control voltage. Moreover, in the signal processing device 20 in the second reference example, the phase error S3 between the partial response waveform S2 estimated according to the PRML scheme and the reproduced waveform S1 is calculated for all sampling points. According to the signal processing device 20 in the second reference example, the clock signal generating unit 29 generates a clock signal by using the phase errors S3 for all sampling points, and therefore a relatively stable clock signal which is scarcely influenced by a jitter noise can be obtained.

However, in the signal processing device 20 in the second reference example, since the phase error S3 is obtained by using the partial response waveform S2 which is a predicted waveform according to the PRML scheme, if the partial response waveform S2 itself includes many errors, the phase error S3 including many errors is undesirably calculated and a clock signal generated by the clock signal generating unit 29 is unstabilized. Thus, it is possible for the signal processing device 20 in the second reference example to generate a stable clock signal, when an error rate of a reproduced signal to be input is equal to or less than a certain value. However, in actual cases, it is not rare that a reproduced waveform which has a high error rate is input, and it is required to provide a signal processing device that adopts a signal processing method capable of generating a stable clock signal even if a reproduced waveform which has a high error rate is input.

(1-4) Configuration of Signal Processing Device 30 According to First Embodiment The signal processing device 30 according to the first embodiment is a device that can solve the problem in the signal processing device 10 in the first reference example illustrated in FIG. 2 (i.e., a large jitter noise near a slice level makes a clock signal unstable) and the problem in the signal processing device 20 in the second reference example illustrated in FIG. 5 (i.e., a clock signal is not stable when a reproduced waveform which has a high error rate is input).

Figure 6:
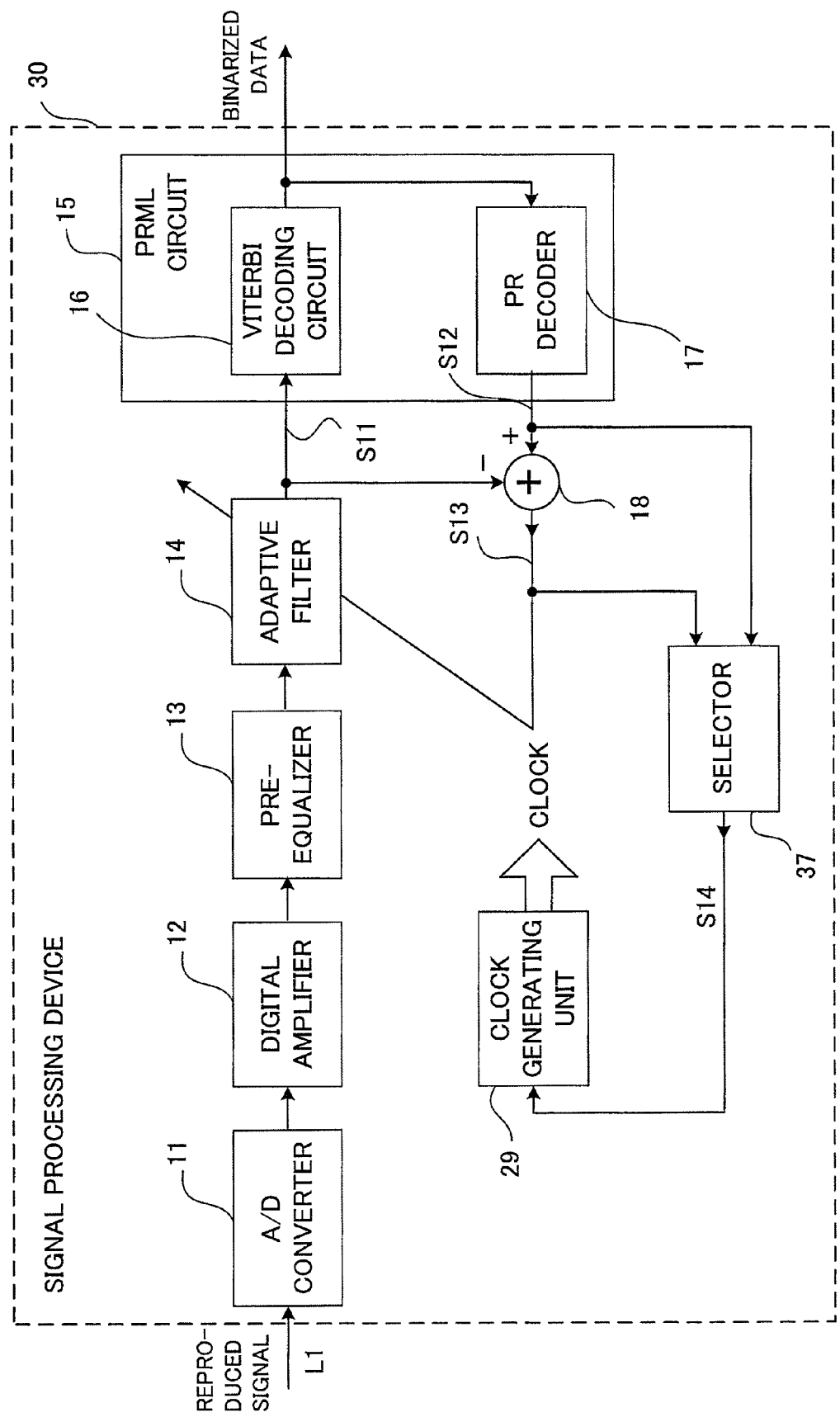
FIG. 6 is a block diagram schematically illustrating a configuration of the signal processing device according to the first embodiment.

FIG. 6 is a block diagram schematically illustrating a configuration of the signal processing device (i.e., a device capable of carrying out a signal processing method according to the first embodiment) 30 according to the first embodiment. In FIG. 6, constituent elements that are the same as or correspond to those shown in FIG. 5 (the second reference example) are assigned the same reference characters. The signal processing device 30 according to the first embodiment can form part of the optical disc apparatus 60 illustrated in FIG. 1. The signal processing device 30 according to the first embodiment differs from the signal processing device 20 in the second reference example (FIG. 5) in a point that the signal processing device 30 includes a selector 37 as a limiter for limiting a phase error S13 to be output.

The signal processing device 30 according to the first embodiment includes: the adaptive filter 14 for filtering adaptively a reproduced waveform of a reproduced signal from a recording medium so as to make the reproduced waveform be closer to a target waveform; the PRML circuit 15 for sequentially generating binarized data from a filtered reproduced waveform S11 using a PRML scheme by sampling at sampling points in a period based on a clock signal, while sequentially generating a partial response waveform S12 which is to be the target waveform from the binarized data; the adder 18 as a calculating unit for sequentially calculating first phase errors S13 with regard to the sampling point from a difference between the target waveform and the filtered reproduced waveform; the selector 37 as a limiting unit for outputting second phase errors S14 by excluding a specific phase error from the first phase errors S13; and the clock signal generating unit 29 for generating a clock signal of a frequency corresponding to the second phase errors S14. The specific phase error includes a phase error with regard to a sampling point which is the closest to a crossing point where the filtered reproduced waveform S11 intersects an average level of the reproduced waveform S11. In addition, it is desirable that the selector 37 make the number of the second phase errors S14 not less than the number of crossing points where the filtered reproduced waveform S11 intersects the average level of the reproduced waveform S11.

Moreover, it is desirable that the specific phase error include a phase error at a time when the partial response waveform S12 reaches a specific level. Here, the specific level indicates any level of: (1) a first level obtained by reproducing binary data which has a shortest data length on a recording medium; (2) a second level obtained by reproducing binary data which has a second-shortest data length on the recording medium; and (3) both of the first and second levels, for example.

It is desirable that the PRML circuit 15 use (1, 2, 2, 2, 1) as a class of the partial response waveform S12, for example, and use, as the specific level, a level including 0 level which is a level at a center point of the partial response waveform S12, ±1 levels which are levels adjacent to the 0 level, and ±2 levels which are levels adjacent to the ±1 levels respectively, for example.

More specifically, in the signal processing device 30 according to the first embodiment, the selector 37 checks, every timing of a clock signal, an amplitude level of the partial response waveform S12 which is a predicted waveform output from the PR decoder 17, and selects whether or not to output the phase error S13 to the loop filter 192 (illustrated in FIG. 5) of the clock signal generating unit 29. The selector 37 includes: a table (memory unit) for storing a reference value for amplitude-level selecting use, and the like; and a comparison selection circuit for checking an amplitude level of the partial response waveform S12 (e.g., comparing it with a reference value) and selecting on the basis of a result of the comparison whether or not to output the phase error S13 to the loop filter 192 of the clock signal generating unit 29, for example. Thus, the signal processing device 30 according to the first embodiment can realize a function of checking, every timing of a clock signal, an amplitude level of the partial response waveform S12 output from the PR decoder 17, and selecting whether or not to output the phase error S13 to the loop filter 192 of the clock signal generating unit 29, while suppressing an increase in an operation amount and an increase in a circuit scale as low as possible.

(1-5) Effects of First Embodiment

The signal processing device 30, the signal processing method and the optical disc apparatus 60 according to the first embodiment have an effect that a stable clock signal can be generated and therefore quality of the binarized data as the reproduced signal can be improved.

Moreover, the signal processing device 30, the signal processing method and the optical disc apparatus 60 according to the first embodiment also have an effect that it is sufficient that the selector includes the table for level-selection use and the comparison selection circuit, and therefore an operation increase amount and a circuit-size increase amount due to this are extremely small.

(1-6) Reason why Effects of First Embodiment can be Achieved

The signal processing device 30 according to the first embodiment is configured so that a stable clock signal can be obtained by limiting an amplitude level (level point) of a reproduced signal which is used for calculating a phase error, even if a waveform has a high error rate. As described in the explanation of the first reference example, a jitter noise tends to be larger, as a reproduced signal of binary data (e.g., record marks (pits) recorded in an optical disc) has a shorter data length.

For this reason, in a phase error calculation, it is effective to exclude a sampling point near a center level of a reproduced signal and to calculate a phase error from data at a sampling point which is not excluded. For example, in the phase error calculation, it is effective to exclude data of an amplitude level with regard to a signal (2T signal) having a shortest data length (i.e., 2T) and to calculate a phase error from data of an amplitude level which is not excluded.

Alternatively, as another example, in the phase error calculation, it is effective to exclude data of an amplitude level with regard to a signal (2T signal) having the shortest data length (i.e., 2T) and data of an amplitude level with regard to a signal (3T signal) having a second-shortest data length (i.e., 3T) and to calculate a phase error from data of an amplitude level which is not excluded.

Figure 7:
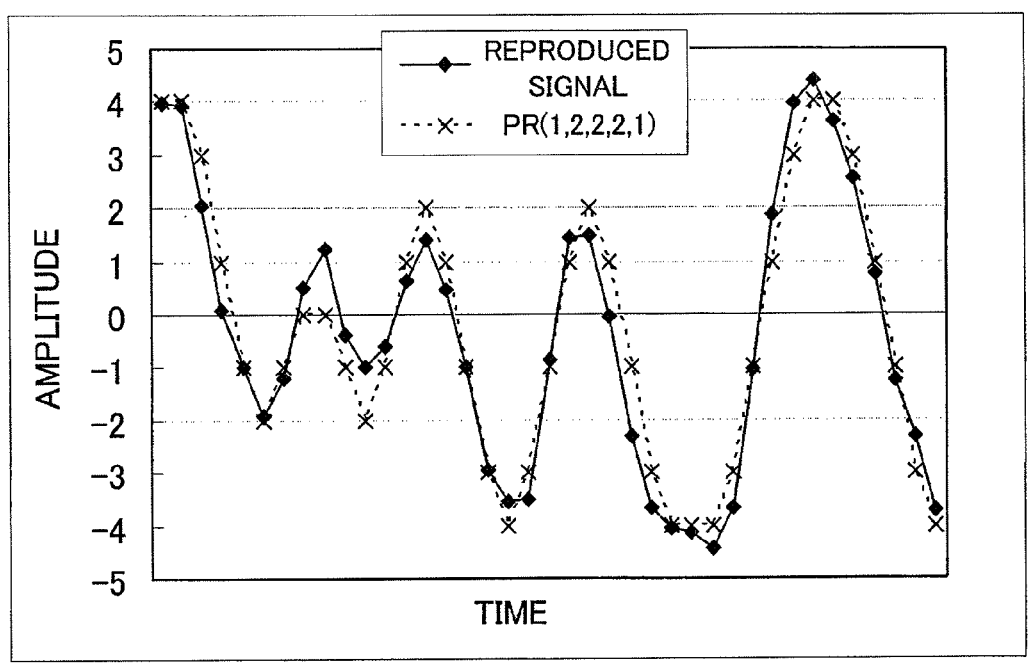
FIG. 7 is a diagram illustrating an example of a reproduced waveform in a case where (1, 2, 2, 2, 1) is used as a partial response class.

FIG. 7 is a diagram illustrating an example of a waveform of a reproduced signal (reproduced waveform), in a case where (1, 2, 2, 2, 1) is used as a partial response class and an error rate is 6E-3 (=6×10$^{-3}$) in the signal processing device 20 (FIG. 5) in the second reference example. In FIG. 7, a solid line represents a waveform of a reproduced signal S11 which is output from the adaptive filter 14, and a dotted line represents a predicted waveform (a target waveform in the adaptive filter 14) which is output from the PR decoder 17, for example. As it can be understood from the example of FIG. 7, an error signal tends to be larger, as a signal has a shorter data length, i.e., as an amplitude level of a reproduced signal is closer to a center level (0 level in FIG. 7). It can be considered from FIG. 7 that it is desirable to exclude from a phase error calculation a signal having a shorter data length, i.e., a signal that an amplitude level of a reproduced signal is closer to a center level (0 level in FIG. 7).

FIG. 8 is a diagram illustrating an example of an error distribution of a signal for each data length of a reproduced waveform (a statistical result of errors to data lengths of the reproduced waveform) as a list, in a case where (1, 2, 2, 2, 1) is used as a partial response class and an error rate is 6E-3 in the signal processing device 20 (FIG. 5) in the second reference example. FIG. 8 indicates the number of samples, the number of errors, error rates and occupancy ratios, with regard to signals having data lengths 2T, 3T, . . . , and 9T, and signals having data lengths 2T to 3T (referred to as 2T-3T), . . . , to signals having data lengths 2T to 9T (referred to as 2T-9T) recorded in an optical disc. The number of samples of the signals having the data lengths 2T-9T is the total number of samples; and the number of errors in the signals having the data lengths 2T-9T is the total number of errors. The occupancy ratio is a value obtained by dividing the number of errors by the total number of errors. It can be understood from columns of the data lengths 2T, 3T, . . . , 9T in FIG. 8 that the number of errors (88 in FIG. 8) in a signal having the data length 2T and the number of errors (102 in FIG. 8) in a signal having the data length 3T are extremely large in comparison with the numbers of errors (12, 8, 4, 4, 1, 0 in FIG. 8) in signals having the other data lengths (4T, 5T, 6T, 7T, 8T, 9T). It can be considered from the statistical result in FIG. 8 that, when (1, 2, 2, 2, 1) is used as the partial response class, it is desirable to calculate a phase error by using signals at amplitude levels, excluding the amplitude levels ±2 where the signals having the data length 2T (the shortest data length) and the data length 3T (the second-shortest data length) form a large proportion.

FIG. 9 is a diagram illustrating an example of a distribution for each amplitude level of a reproduced waveform (a statistical result of sampling points to amplitude levels of the reproduced waveform) as a list, in a case where (1, 2, 2, 2, 1) is used as the partial response class and the error rate is 6E-3 in the signal processing device 20 (FIG. 5) in the second reference example. It can be understood from FIG. 9 that divergence in a range of amplitude levels 0 to ±3 (i.e., the amplitude levels −3, −2, −1, 0, +1, +2, +3) is larger than divergence at the amplitude levels −4 and +4. As it can be understood from average values at respective amplitude levels in FIG. 9, this is considered to be caused by that only average values (−1.35 and +1.66) at the amplitude levels −2 and +2 are extremely smaller than amplitude levels of an ideal waveform (values −2 and +2). It can be considered from the statistical result in FIG. 9 that, when (1, 2, 2, 2, 1) is used as the partial response class, it is desirable to calculate a phase error by using signals at the amplitude levels ±4.

FIG. 10 is a diagram illustrating an example of a distribution of data lengths at respective amplitude levels (probability which can be taken by each data length at each level) in the signal processing device 20 as a list, in a case where (1, 2, 2, 2, 1) is used as the partial response class and an error rate is 6E-3 in the signal processing device 20 (FIG. 5) in the second reference example. The probabilities indicated in FIG. 10 are values obtained by rounding off decimals. In FIG. 10, a total of points where an amplitude level of a reproduced waveform reaches zero (values of the data length range 2T-9T) is defined as 100%. It can be understood from FIG. 10 that an amplitude level where signals having the data lengths 2T and 3T form a large proportion is a level range of the amplitude levels 0 to ±3 (i.e., the amplitude levels −3, −2, −1, 0, +1, +2, +3). As it is already described by using FIG. 9, divergence is relatively large in a level range of the amplitude levels 0 to ±3. Thus, it can be understood that errors in the signals having the data lengths 2T and 3T greatly influence the divergence. It can be considered from the statistical result of FIG. 10 that, when (1, 2, 2, 2, 1) is used as the partial response class, it is desirable to calculate a phase error by using signals at amplitude levels ±4, excluding the level range of the amplitude levels 0 to ±3 where the signals having the data length 2T (the shortest data length) and the data length 3T (the second-shortest data length) form a large proportion.

However, in a case where the phase error calculation is performed by reflecting the result of FIG. 10 and by using only data at the amplitude levels ±4, the number of samples undesirably decreases to approximately 48% (i.e., a total value of a value 24% at the amplitude level +4 and a value 24% at the amplitude level −4 in a line of the data lengths 2T-9T in FIG. 10), in comparison with a case where data at the amplitude level 0 is used. Since the number of samples is equivalent to a rate for the phase error calculation, loop gain decreases and a stable clock signal cannot be generated.

Thus, it can be considered that it is desirable to use, for the phase error calculation, not only the signals at the amplitude levels ±4 but also the signals at the amplitude levels ±3 where signals having the data length 2T (the shortest data length) and the data length 3T (the second-shortest data length) form a small proportion and where the number of sampling points is comparatively large. In this case, sampling points used for the phase error calculation are approximately 142% (i.e., a value obtained by adding the total value 48% of the value 24% at the amplitude level +4 and the value 24% at the amplitude level −4 in the line of the data lengths 2T-9T in FIG. 10 to a total value 94% of a value 47% at the amplitude level +3 and a value 47% at the amplitude level −3 in the line of the data lengths 2T-9T in FIG. 10). Thus, according to the signal processing device 30 in the first embodiment, loop gain is approximately 1.4 times in comparison with that in the signal processing device 10 in the first reference example where the slice level (value 0) is used.

For the above reasons, it is possible for the signal processing device 30 according to the first embodiment to generate a stable clock signal, even if a reproduced signal has a greatly deteriorated waveform and a high error rate, and therefore to achieve an effect that quality of binarized data as a reproduced signal can be improved.

(1-7) Modified Example of First Embodiment

In the example described above, the case is described where it is possible to generate a stable clock when there are extremely large numbers of errors in waveforms of the signals having the data length 2T (the shortest data length) and the data length 3T (the second-shortest data length), and where data of the amplitude levels with regard to the signals having the data length 2T (the shortest data length) and the data length 3T (the second-shortest data length) are excluded. However, the selection of an amplitude level to be excluded is not limited to the data of the amplitude level with regard to the signals having the data length 2T (the shortest data length) and the data length 3T (the second-shortest data length), and it is possible to exclude data of an amplitude level with regard to a signal having another data length. For example, if it is boosted by a low-order equalizer, signals having the data lengths 7T and 8T that form a low band overshoot and a deviation from an ideal waveform occurs. If it is configured to use such an equalizer, it is necessary to exclude amplitude levels with regard to the overshoot of the data lengths 7T and 8T. More specifically, by excluding data at the amplitude levels ±3 and ±4 and by using data at the amplitude levels 0, ±1 and ±2 to calculate a phase error, sampling points are approximately 292% (i.e., a value obtained by adding a value 100% at the amplitude level 0, a value 80% at the amplitude level −1, a value 80% at the amplitude level +1, a value 16% at the amplitude level −2 and a value 16% at the amplitude level +2 in the line of the data lengths 2T-9T in FIG. 10) after a noise due to the overshoot is reduced, and thus it is possible to generate a stable clock signal.

In addition, although the case where the 1-7 RLL scheme is used as the modulation scheme is described in the example described above, instead of this scheme, any of 8-16 modulation scheme, 8-14 modulation scheme or other scheme used in DVDs or CDs may be used, for example. Thus, even if any different modulation schemes are used, it is possible to generate a stable clock signal likewise the case where the 1-7 RLL modulation scheme is used.

Figure 11:
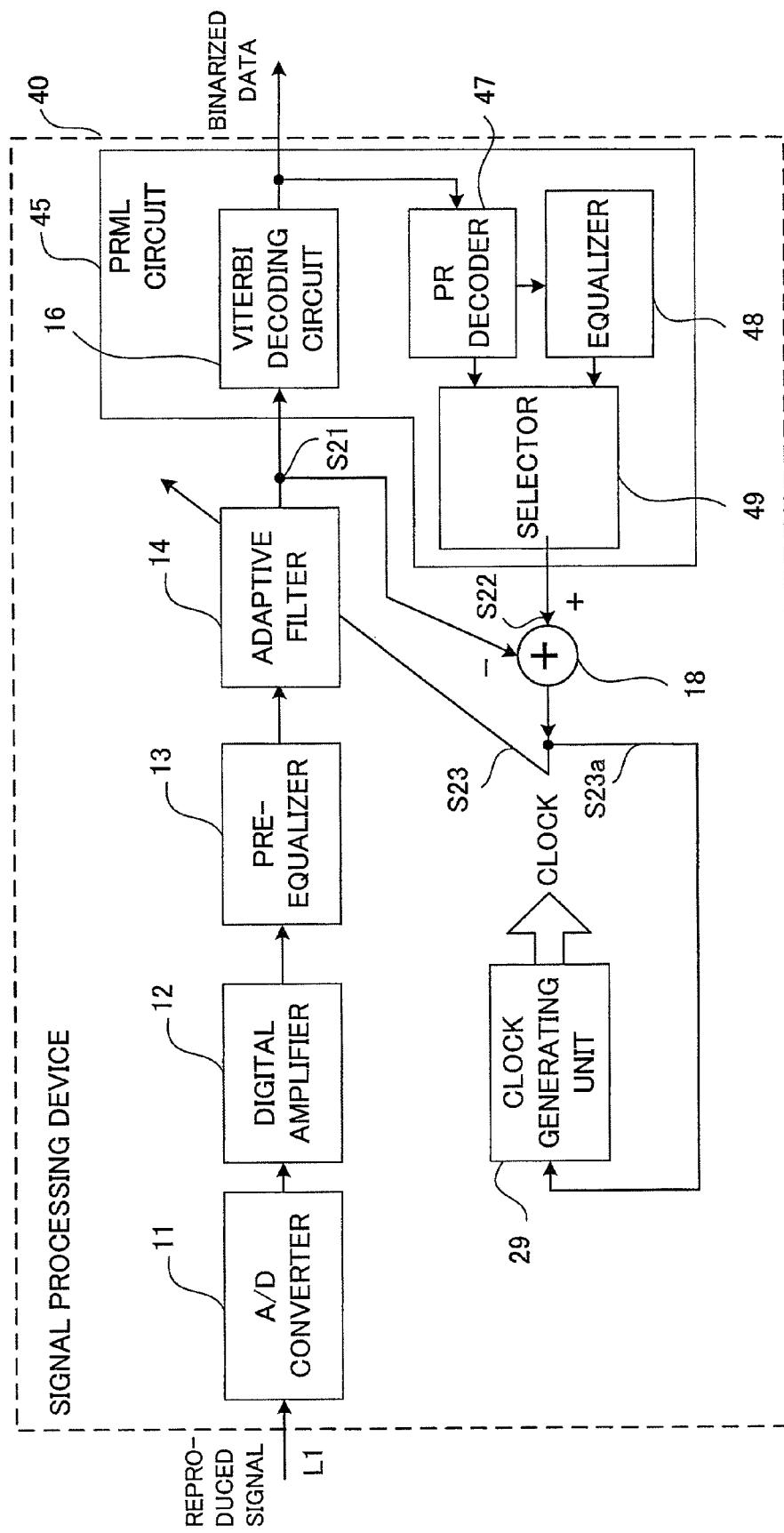
FIG. 11 is a block diagram schematically illustrating a configuration of the signal processing device according to the second embodiment.

(2) Second Embodiment (2-1) Signal Processing Device 40 According to Second Embodiment FIG. 11 is a block diagram schematically illustrating a configuration of a signal processing device 40 according to a second embodiment (i.e., a device capable of carrying out a signal processing method according to the second embodiment). In FIG. 11, constituent elements that are the same as or correspond to those shown in FIG. 5 (the second reference example) are assigned the same reference characters. The signal processing device 40 according to the second embodiment can be included in the optical disc apparatus 60 illustrated in FIG. 1 to form part of the optical disc apparatus 60.

The signal processing device 40 according to the second embodiment includes: an adaptive filter 14 for filtering adaptively a reproduced waveform of a reproduced signal from a recording medium so as to make the reproduced waveform be closer to a target waveform; a PRML circuit 45 for sequentially generating binarized data from a filtered reproduced waveform S21 using a PRML scheme by sampling at sampling points in a period based on a clock signal, while sequentially generating a partial response waveform from the binarized data; an equalizer 48 for equalizing the partial response waveform to generate the target waveform; a calculating unit 18 for sequentially calculating a phase error S23 with regard to the sampling point from a difference between the partial response waveform S22 and the filtered reproduced waveform S21; and a clock signal generating unit 29 for generating a clock signal of a frequency corresponding to the phase error. The equalizer 48 has a function to increase or decrease a specific level of the partial response waveform. The PRML circuit 45 is capable of using (1, 2, 2, 2, 1) as a class of the partial response waveform.

In addition, the signal processing device 40 according to the second embodiment may include a limiting unit for excluding a waveform of a specific level from a target waveform which is used for calculating the phase error S23, likewise the selector 37 in the first embodiment.

More specifically, the signal processing device 40 according to the second embodiment differs from the signal processing device 20 in the second reference example in the following points: the signal processing device 40 includes the equalizer 48 for equalizing the partial response waveform S22 which is a predicted waveform output from a PR decoder 47, and includes a selector 49; an equalized partial response waveform is used as the target waveform in the adaptive filter 14; and a difference signal S23a obtained by using a non-equalized partial response waveform is supplied to the clock signal generating unit 29. The following description of the signal processing device 40 according to the second embodiment will be focused on the differences from the signal processing device 20 in the second reference example.

As illustrated in FIG. 11, the signal processing device 40 according to the second embodiment is capable of adjusting, by the equalizer 48, the predicted waveform (the target waveform in the adaptive filter 14) S22 which is output from the PR decoder 47 for each amplitude level. For example, in a case of the reproduced waveform (the reproduced waveform S11 in FIG. 6) which is used in the signal processing device 20 in the second reference example, as it can be understood from FIG. 9, average values of the reproduced waveform are +1.66 and −1.35 in data of the amplitude levels +2 and −2, and a difference between the amplitude levels and the average values of the reproduced waveform is large. As a countermeasure against this, the signal processing device 40 according to the second embodiment includes the equalizer 48 to amplify the data of the amplitude levels +2 and −2 (an equalization function), thereby changing the amplitude levels of the predicted waveform S22 from ±2 to ±2.5, for example, and emphasizing the error signal S23. By feeding back the emphasized error signal S23 which is emphasized by the equalizer 48 to the adaptive filter 14, a filter coefficient in the adaptive filter 14 is changed and an equalization effect is indirectly brought about to the reproduced waveform S21.

(2-2) Effects of Second Embodiment

The signal processing device 40, the signal processing method and the optical disc apparatus 60 according to the second embodiment have an effect that a stable clock signal can be generated and therefore quality of the binarized data as the reproduced signal can be improved.

In the signal processing device 40 according to the second embodiment, although the phase error S23 between the predicted waveform S22 which is output from the PR decoder 47 and the reproduced waveform S21 is large, it is possible to stabilize a phase error between a crossing point to a slice level and a sampling point, or a phase error between a waveform which is estimated according to the PRML scheme before the amplitude level of the target waveform S22 is changed by the equalizer 48 and the sampling point.

Therefore, as the phase error S23 which is fed back to the clock signal generating unit 29, it is sufficient to use a difference between the reproduced waveform S21 filtered by the adaptive filter 14 and the output from the PR decoder 47 before the equalization by the equalizer 48.

Moreover, by adding, in the equalizer 48 in FIG. 11, an element (e.g., a table for level-selection use and a comparison selection circuit) for switching an amplitude level which is output as a target signal fed back to the adaptive filter 14 and an amplitude level which is output as a predicted signal fed back to the clock signal generating unit 29, the second embodiment can be realized, and therefore the effect of the signal processing method described above can be obtained, with little operation increase amount or little circuit-size increase amount.

(2-3) First Modified Example of Second Embodiment

Figure 12:
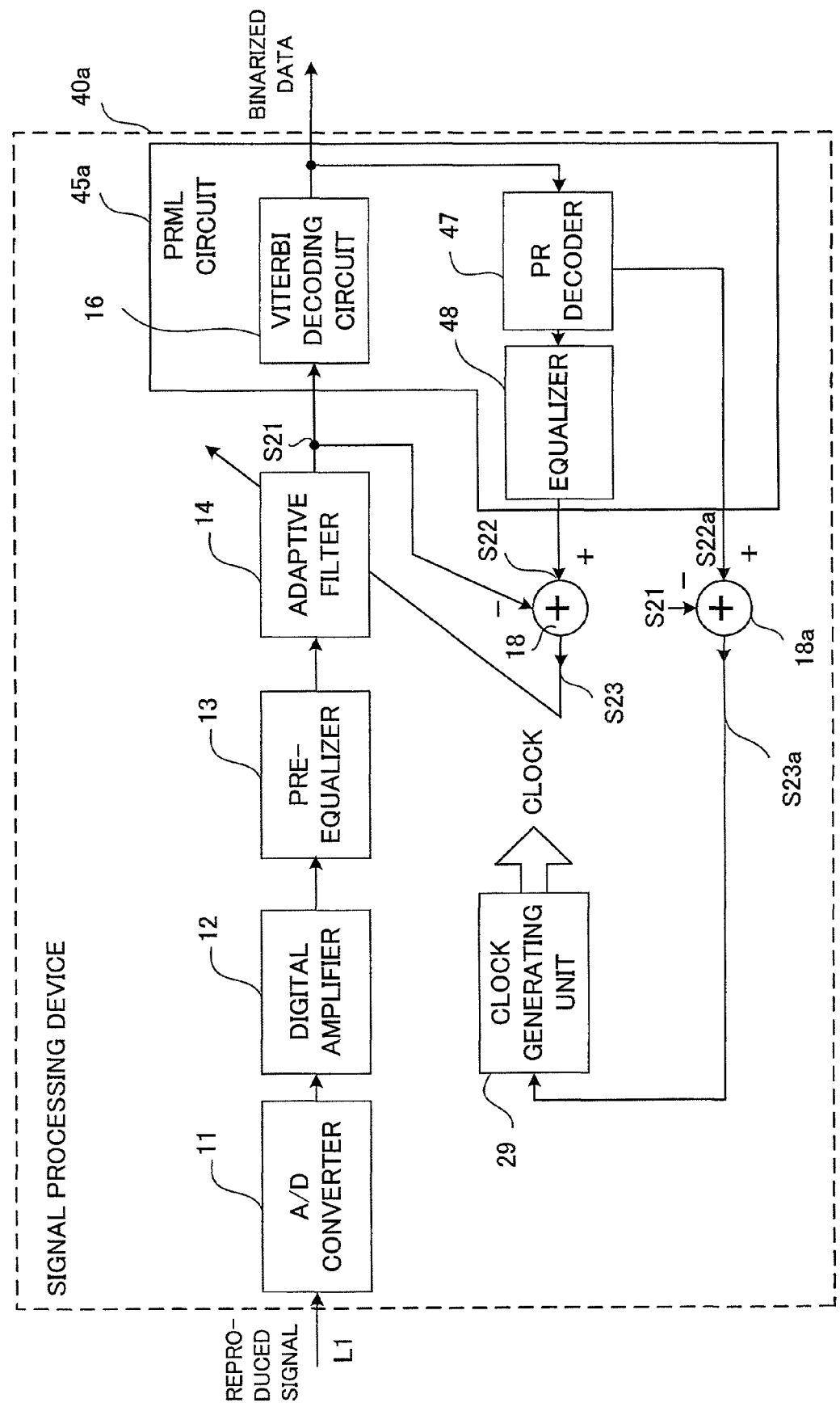
FIG. 12 is a block diagram schematically illustrating a configuration of a signal processing device according to a modified example of the second embodiment.

FIG. 12 is a block diagram schematically illustrating a configuration of a signal processing device 40a according to a modified example of the second embodiment. In FIG. 12, constituent elements that are the same as or correspond to those shown in FIG. 11 are assigned the same reference characters. The signal processing device 40a can be included in the optical disc apparatus 60 illustrated in FIG. 1 to form part of the optical disc apparatus 60. The signal processing device 40a differs from the signal processing device 20 in the second reference example in the following points: the signal processing device 40a has the equalizer 48 for equalizing the partial response waveform S22 which is a predicted waveform output from the PR decoder 47; an equalized partial response waveform is used as a target waveform in the adaptive filter 14; the signal processing device 40a has an adder (subtractor) 18a as another calculating unit; and a difference signal S23a which is obtained by using a non-equalized partial response waveform is supplied to the clock generating unit 29. In this case, effects similar to those in the case of FIG. 11 can be also obtained.

(2-4) Second Modified Example of Second Embodiment

As another example, in a case where asymmetry of the reproduced waveform S21 is large and an offset is superimposed on a signal having a short data length (e.g., signals having data lengths 2T and 3T), for example, it may be configured to superimpose an inverse offset of the offset which is superimposed on the reproduced waveform S21, on the predicted waveform S22 by the equalizer 48, thereby emphasizing the phase error S23 and feeding back the emphasized phase error S23 to the adaptive filter 14.

(2-5) Third Modified Example of Second Embodiment

In the second embodiment, it may be configured to use only an amplitude level which is not necessary to be emphasized, as an amplitude level of the target signal. Although it is configured to use the amplitude levels ±2.5, for example, as the target signal at the amplitude levels ±2 in the explanation described above, amplitude levels other than the amplitude levels ±2, i.e., the amplitude levels 0, ±1, ±3 and ±4 may be used as a phase error which is fed back to the clock signal generating unit 29. In this case, the signal processing device 40 according to the second embodiment has a configuration similar to that of the signal processing device 30 according to the first embodiment, and similar effects can be obtained with a small operation amount. Therefore, the signal processing device 40 and the signal processing method according to the second embodiment can generate a stable clock signal, even if a reproduced signal has a greatly deteriorated waveform and a high error rate.

In addition, although the case where the 1-7 RLL modulation is used as a modulation scheme is described in the example described above, the modulation scheme is not limited to this, and 8-16 modulation scheme or 8-14 modulation scheme used for reproducing DVDs or CDs may be used, for example.

(3) Third Embodiment

Figure 13:
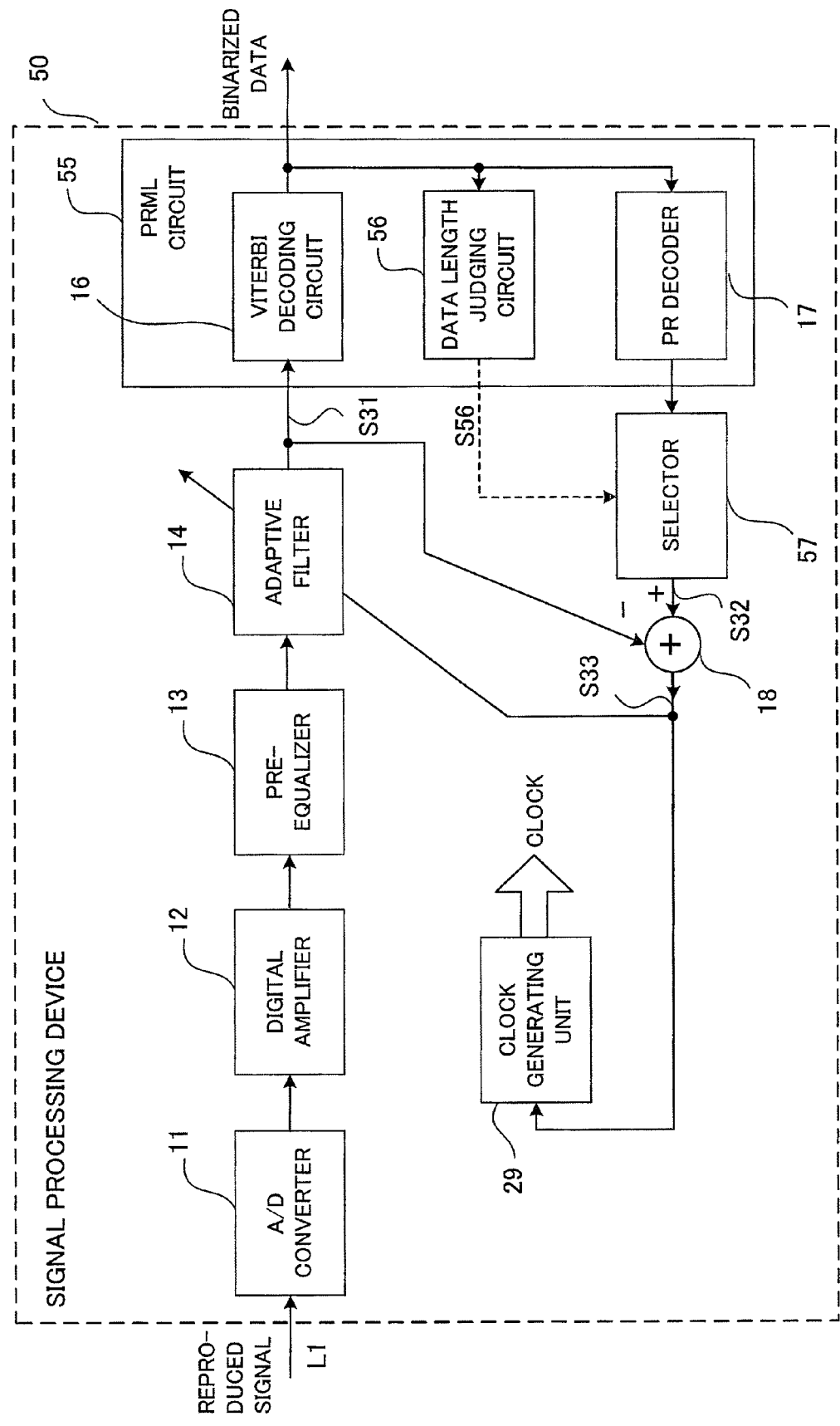
FIG. 13 is a block diagram schematically illustrating a configuration of the signal processing device according to the third embodiment.

(3-1) Configuration and Operations of Signal Processing Device 50 According to Third Embodiment FIG. 13 is a block diagram schematically illustrating a configuration of a signal processing device according to a third embodiment (i.e., a device capable of carrying out a signal processing method according to the third embodiment) 50. In FIG. 13, constituent elements that are the same as or correspond to those shown in FIG. 5 (the second reference example) are assigned the same reference characters. The signal processing device 50 according to the third embodiment can be included in the optical disc apparatus 60 illustrated in FIG. 1 to form part of the optical disc apparatus 60. As illustrated in FIG. 13, the signal processing device 50 according to the third embodiment differs from the signal processing device 20 in the second reference example illustrated in FIG. 5 in the following points: the signal processing device 50 includes a data-length judging circuit 56; and a selector 57 is switched on the basis of a control signal S56 from the data-length judging circuit 56. The following description of the signal processing device 50 according to the third embodiment will be focused on the differences from the signal processing device 20 in the second reference example.

The data-length judging circuit 56 judges a data length of binarized data output from the Viterbi decoding circuit 16, and transmits to the selector 57 the control signal S56 which is based on a result of the judgment. In addition, although the data-length judging circuit 56 is illustrated as part of a PRML circuit 55 in FIG. 13, the data-length judging circuit 56 may be provided outside the PRML circuit 55.

The selector 57 switches, on the basis of the control signal S56 received from the data-length judging circuit 56, a value of an error signal S33 which is input to the adaptive filter 14 and the loop filter 192 (illustrated in FIG. 5) of the clock signal generating unit 29. If the data length of the binarized data output from the Viterbi decoding circuit 16 is a predetermined data length (a data length 2T in the third embodiment), the selector 57 performs on the basis of the received control signal S56 and does not output a signal S32 from the PR decoder 17 to the adder 18. If the data length of the binarized data output from the Viterbi decoding circuit 16 is other than 2T, the selector 57 outputs the target signal S32 which is output from the PR decoder 17 to the adder 18. For this reason, if the data length of the binarized data output from the Viterbi decoding circuit 16 is the predetermined data length (the data length 2T in the third embodiment), the phase error S33 which is output from the adder 18 has an error waveform based on a reproduced waveform; and if the data length of the binarized data output from the Viterbi decoding circuit 16 is other than 2T, the phase error S33 is an error signal S33 which is obtained by subtracting a reproduced signal S31 from the target waveform S32 from the PR decoder 17. Thus, a value of the signal S33 which is obtained by subtracting the reproduced signal S31 from the target signal S32 from the PR decoder 17 is switched on the basis of the received control signal S56.

In the second embodiment, an amplitude level of an output signal from the PR decoder 47 is varied. However, a signal having a short data length (e.g., signals having the data lengths 2T and 3T) can take an amplitude level within a wide range from the amplitude level −3 to the amplitude level +3, as illustrated in FIG. 10. Thus, whereas the signal processing device 30 according to the first embodiment is configured to use data at the amplitude levels ±4 and ±3 for calculating a phase error, the signal processing device 50 according to the third embodiment includes data at the amplitude levels ±3 that can be taken by a signal having the data length 2T or 3T, for calculating an error signal.

In the signal processing device 50 according to the third embodiment, the addition of the data-length judging circuit 56 as illustrated in FIG. 13 allows to know a sampling point with regard to a signal having a desired data length, and so only an error signal with regard to the signal having the desired data length can be fed back to the loop filter 192 of the clock signal generating unit 29. For this reason, in the signal processing device 50 according to the third embodiment, a phase error with regard to a signal having the data length 2T can be excluded, for example, as a phase error which is fed back to the loop filter 192 of the clock signal generating unit 29.

In addition, since the example described above is an example where the 1-7 RLL modulation is used as a modulation scheme, the modulation scheme is not limited to this. Similar effects can be obtained by similar means according to 8-16 modulation scheme or 8-14 modulation scheme which is used for DVDs or CDs, for example.

Although the above explanation describes the case where the phase error with regard to the signal having the data length 2T is excluded, it is not limited to this in a case of some reproduced waveforms. For example, in a case where a reproduced waveform has large asymmetry, it is sufficient to configure so as to exclude not only the phase error with regard to the signal having the data length 2T but also phase errors with regard to a signal having the data length 3T and a signal having the data length 4T. At the time, as in FIG. 10, points after subtraction of the number of samples with regard to 2T-4T, i.e., the number of samples with regard to 5T or more is approximately 152%, in comparison with a case where a slice level is defined as 0 level. Thus, in the signal processing device 50 according to the third embodiment, after noises are reduced, loop gain is approximately 1.5 times in comparison with a clock generating unit which uses a slice level of 0.

(3-2) Effects of Third Embodiment

The signal processing device 50, the signal processing method and the optical disc apparatus 60 according to the third embodiment have an effect that a stable clock signal can be generated and therefore quality of the binarized data as the reproduced signal can be improved.

Moreover, the signal processing device 50, the signal processing method and the optical disc apparatus 60 according to the third embodiment can calculate a phase error with higher accuracy and can generate a stable clock signal, even if a reproduced waveform has a greatly deteriorated waveform and a high error rate.

Moreover, the signal processing device 50, the signal processing method and the optical disc apparatus 60 according to the third embodiment also have an effect that it is sufficient that the selector includes the table for level-selection use and the comparison selection circuit, and therefore an operation increase amount and a circuit-size increase amount due to this are extremely small.

(4) Modified Example

As described above, according to the signal processing devices and the signal processing methods of the first to third embodiments, it is possible to generate a stable clock signal even if a reproduced signal has a greatly deteriorated waveform and a high error rate.

Moreover, in a case where the above-described signal processing method is incorporated in the signal processing device, it is possible to obtain the effects according to the above-described signal processing method without increasing an operation load or a circuit load.

EXPLANATION OF REFERENCE CHARACTERS

30, 40, 40a, 50 signal processing device; 11 A/D converter circuit; 12 digital amplifier; 13 preequalizer; 14 adaptive filter; 15, 45, 45a, 55 PRML circuit; 16 Viterbi decoding circuit; 17, 47 PR decoder; 18, 18a adder (subtractor); 19 PLL circuit; 29 clock signal generating unit; 37, 57 selector (limiting unit); equalizer; 49 selector; 56 data-length judging circuit; 60 optical disc apparatus; 70 optical disc (recording medium); 191 phase comparator; 192 loop filter; 193 voltage-controlled oscillator; T length of one period of clock signal (one clock period).

What is claimed is:

1. A signal processing device comprising:
    an adaptive filter for filtering adaptively a reproduced waveform of a reproduced signal from a recording medium so as to make the reproduced waveform be closer to a target waveform;
    a PRML circuit for sequentially generating binarized data from the filtered reproduced waveform using a PRML scheme by sampling at sampling points in a period based on a clock signal and sequentially generating a partial response waveform which is to be the target waveform from the binarized data;
    a calculating unit for sequentially calculating first phase errors with regard to the sampling points from a difference between the target waveform and the filtered reproduced waveform;
    a limiting unit for outputting second phase errors by excluding a specific phase error from the first phase errors; and
    a clock generating unit for generating the clock signal of a frequency corresponding to the second phase errors;
    wherein the specific phase error includes a phase error at a time when the partial response waveform reaches a specific level which excludes at least a level not less than a predetermined amplitude level.

2. The signal processing device according to claim 1, wherein the limiting unit makes number of second phase errors to be output from the limiting unit not less than number of crossing points that are points where the reproduced signal intersects a certain slice level.

3. The signal processing device according to claim 1, wherein the specific level is any level of a first level obtained by reproduction of binary data having a shortest data length on the recording medium, a second level obtained by reproduction of binary data having a second-shortest data length on the recording medium, and both levels of the first level and the second level.

4. The signal processing device according to claim 1, wherein the PRML circuit uses (1, 2, 2, 2, 1) as a class of the partial response waveform, and the specific level is a level including 0 level which is a level at a center point of the partial response waveform, ±1 levels which are levels adjacent to the 0 level, and ±2 levels which are levels adjacent to the ±1 levels respectively.

5. The signal processing device according to claim 1 further comprising a data-length judging unit for judging from the binarized data at each sampling point whether or not a data length of binary data recorded in a recording medium is a specific data length, wherein the limiting unit supplies the calculating unit with only a partial response waveform at sampling points which are judged by the data-length judging unit to be binary data having the specific data length.

6. The signal processing device according to claim 5, wherein the specific data length includes a data length corresponding to two clock periods of the clock signal and a data length corresponding to three clock periods of the clock signal.

7. The signal processing device according to claim 6, wherein the PRML circuit uses (1, 2, 2, 2, 1) as a class of the partial response waveform, and the data-length judging unit calculates the phase error by excluding sampling points with regard to a signal corresponding to binary data having a shortest data length on the recording medium and a signal corresponding to binary data having a second-shortest data length on the recording medium, out of levels including 0 level which is a level at a center point of the partial response waveform, ±1 levels which are levels adjacent to the 0 level, ±2 levels which are levels adjacent to the ±1 levels respectively, and ±3 levels which are levels adjacent to the ±2 levels respectively.

8. A method of processing a signal comprising the steps of:

filtering adaptively a reproduced waveform of a reproduced signal from a recording medium so as to make the reproduced waveform be closer to a target waveform;

sequentially generating binarized data from the filtered reproduced waveform using a PRML scheme by sampling at sampling points in a period based on a clock signal and sequentially generating a partial response waveform which is to be the target waveform from the binarized data;

sequentially calculating first phase errors with regard to the sampling points from a difference between the target waveform and the filtered reproduced waveform;

outputting second phase errors by excluding a specific phase error from the first phase errors; and generating the clock signal of a frequency corresponding to the second phase errors;

wherein the specific phase error includes a phase error at a time when the partial response waveform reaches a specific level which excludes at least a level not less than a predetermined amplitude level.

9. A method of processing a signal comprising the steps of:

filtering adaptively a reproduced waveform of a reproduced signal from a recording medium so as to make the reproduced waveform be closer to a target waveform;

sequentially generating binarized data from the filtered reproduced waveform using a PRML scheme by sampling at sampling points in a period based on a clock signal, and sequentially generating a partial response waveform from the binarized data;

generating the target waveform by equalizing the partial response waveform;

sequentially calculating a phase error with regard to the sampling point from a difference between the partial response waveform and the filtered reproduced waveform; and generating the clock signal of a frequency corresponding to the phase error.

10. An optical disc apparatus comprising:

an optical head device for optically reading binary data which is recorded in a recording medium;

a reproduced signal processing unit for generating a reproduced signal from a signal which is output from the optical head device; and the signal processing device according to claim 1 for generating the binarized data from the reproduced signal.

* * * * *